RANDOM ACCESS MEMORY SYSTEMS

Filed Aug. 31, 1956

INVENTOR.
H. Frazer Welsh
BY
Charles G. English
AGENT

United States Patent Office 3,183,494
Patented May 11, 1965

3,183,494
RANDOM ACCESS MEMORY SYSTEMS

Herbert Frazer Welsh, Philadelphia, Pa., assignor to Sperry Rand Corporation, New York, N.Y., a corporation of Delaware Filed Aug. 31, 1956, Ser. No. 607,457
23 Claims. (Cl. 340—174.1)

The present invention relates to improved memory or information storage devices, and is particularly concerned with such memory systems providing for rapid random access to stored information. In this respect the present invention contemplates the provision of such an improved random access memory system through the utilization of plural tapes, preferably of the magnetic type, for the storage and reproduction of information.

Various forms of magnetic information storage structures, such as may be employed in electronic computers, have been suggested in the past, and such memories have for the most part taken the form of magnetic drums, disks, or tapes. Drums and disks have been subject to the disadvantage that they comprise relatively large and unwieldly structures whereby the storage of information thereon may become uneconomical when a large capacity memory is desired. The use of elongated tapes has been subject to the further disadvantage that access to information has been relatively slow, particularly when it is required that an appreciable length of tape be driven past a transducer before a desired recording is reached. In view of this latter consideration, magnetic tapes have been considered impractical for random access memories suggested heretofore, and drums and disks have accordingly, for the most part, been employed.

The present invention is directed toward an improved storage device utilizing magnetic tapes whereby the advantages of relatively small size and high word density can be achieved in a storage structure; and the system is particularly concerned with so arranging a plurality of such magnetic tapes that more rapid access to desired information may be achieved than has been the case in prior memory systems.

It is accordingly an object of the present invention to provide improved memory devices.

A further object of the present invention resides in the provision of an improved magnetic recording and reproducing structure having high word density and adapted to permit more rapid access to stored information than has been the case heretofore.

Another object of the present invention resides in the provision of improved random access memory devices.

A further object of the present invention resides in the provision of improved random access memory structures employing a plurality of storage tapes, preferably magnetic tapes.

Still another object of the present invention resides in the provision of an improved random access memory for use with computers, which memories are simpler in design and are of smaller size for the storage of a given amount of information than has been the case heretofore.

A still further object of the present invention resides in the provision of an improved disposition for plural storage tapes whereby a single transducer may be caused to be placed in operative juxtaposition with any preselected one of the said tapes.

Still another object of the present invention resides in the provision of an improved random access memory comprising a plurality of magnetic tapes disposed adjacent a magnetic transducer in combination with an improved search arrangement for causing the said transducer to be moved into operative juxtaposition with any preselected one of the said tapes.

Another object of the present invention resides in the provision of an improved driving system for magnetic tape devices whereby drive of a magnetic tape past a transducer is controlled by the position of the said transducer relative to the tape.

Still another object of the present invention resides in the provision of an improved information storage structure which has a lower cost per unit of recorded information than disk or drum storage devices employed heretofore, and which exhibits a faster access time to stored information than has been the case with prior memory devices of the random access type.

In providing for the foregoing objects and advantages, the present invention contemplates the provision of a plurality of elongated magnetic tapes, each of which is preferably endless in configuration; and the said tapes are removably and interchangeably supported adjacent one another in a common supporting structure. In a preferred embodiment of the invention, the said plurality of tapes are disposed, with respect to one another, in a substantially circular path whereby a transducer, which is rotatably mounted adjacent the said path, may be caused to cooperate with any preselected one of the said tapes. As will become apparent from the subsequent description, the capacity of the memory may be made quite large when the aforementioned circularly disposed tapes are stacked one upon another to effect a substantially cylindrical array; and a transducer, in such an arrangement, may be caused to search in two dimensions, one of which is substantially concentric with the axis of the aforementioned cylindrical array and the other of which is substantially parallel to the axis of the aforementioned cylindrical array, whereby any one of the tapes in the said cylindrical array may be selected for operation.

The memory system of the present invention further includes a driving structure movable with the aforementioned transducer and operatively responsive to the position of the said transducer relative to any given tape whereby a preselected tape is caused to be driven past the transducer when the said transducer is in operative juxtaposition with the said preselected tape.

As will become apparent from the subsequent description, the several tapes comprising the present invention may be variably disposed with respect to the aforementioned common transducer structure and may be removably supported in an overall system in various arrangements. The essence of the present invention, however, comprises the provision of a plurality of tapes adapted to cooperate with a common transducer which may in turn be caused to move in various dimensions thereby to preselect any given tape for operation; and the said tapes may thereafter be selectively driven past the said transducer in response to variations in transducer position whereby rapid random access to storage information can be achieved.

The foregoing objects, advantages, construction and operation of the present invention will become more readily apparent from the following description and accompanying drawings, in which.

Figure 1:
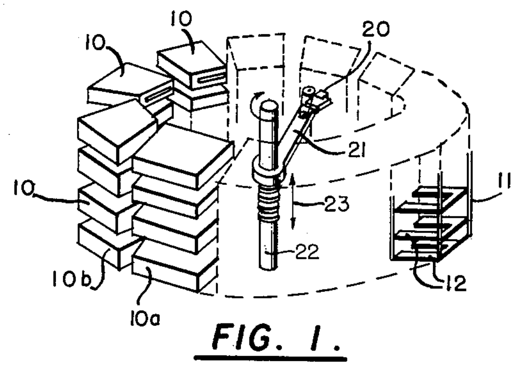
FIGURE 1 is an illustrative representation of a tape memory system constructed in accordance with the present invention.

Referring now to the several figures in the case, it will be seen that, in accordance with the present invention, an improved random access memory system may comprise a plurality of loop boxes 10 disposed in a substantially cylindrical array. In particular, the said loop boxes comprise groups of boxes, such as 10*a*, 10*b*, etc., disposed closely adjacent one another along a substantially circular path whereby each such group of boxes takes a substantially doughnut configuration; and plural such groups are stacked one upon another to effect the desired substantially cylindrical array. The several loop boxes may be individually supported in a common supporting structure, such as a rack 11 (see FIGURE 1) comprising a plurality of supporting shelves 12; and each loop box 10 may be removably placed in a rack such as 11 whereby individual boxes can be removed from the overall memory structure for storage or replacement with other similar boxes having desired information therein.

Each loop box 10 (see FIGURE 3) contains a plurality of pulley devices 13 therein, and these pulley devices in turn support an elongated tape, preferably a magnetic tape 14, which is endless in configuration. Means, such as spring 15, may also be included within a loop box 10 to impose a desired predetermined tension upon tape 14. Each loop box 10 is open-ended in configuration and defines an elongated length of tape 16 adjacent the open end of the box, whereby the said open end of the box may act as a read-write station for a given box.

Returning now to FIGURE 1, it will be noted that the open ends of the several loop boxes comprising the cylindrical array depicted, are disposed facing the center of the cylindrical array; and a transducer is mounted within the center of the array for selective cooperation with any preselected one of the loop boxes. In a particular preferred form of the present invention, shown in FIGURE 1, the transducer 20 is movably mounted (as will be described in reference to FIGURE 2) adjacent the terminus of an elongated arm 21 which is in turn carried by a shaft 22 disposed substantially coaxial with the elongated axis of the cylindrical array; and means are provided for rotating shaft 22 whereby transducer 20 describes a circular path. Further means are provided for moving arm 21 and transducer 20 carried thereby up or down, as at 23, relative to shaft 22.

It will be appreciated, therefore, that the arrangement of transducer 20 relative to shaft 22 and relative to the several loop boxes 10, is such that the said transducer 20 may be caused to search in two dimensions, one of which is substantially concentric with the shaft 22 and the other of which is substantially parallel to the said shaft 22. By this arrangement, therefore, the transducer 20 may be caused to move into operative juxtaposition adjacent the open end of any one of the loop boxes 10 disposed in the cylindrical array shown in FIGURE 1, whereby information may be recorded on the tape in that preselected box, or information may, in the alternative, be read therefrom.

Figure 2:
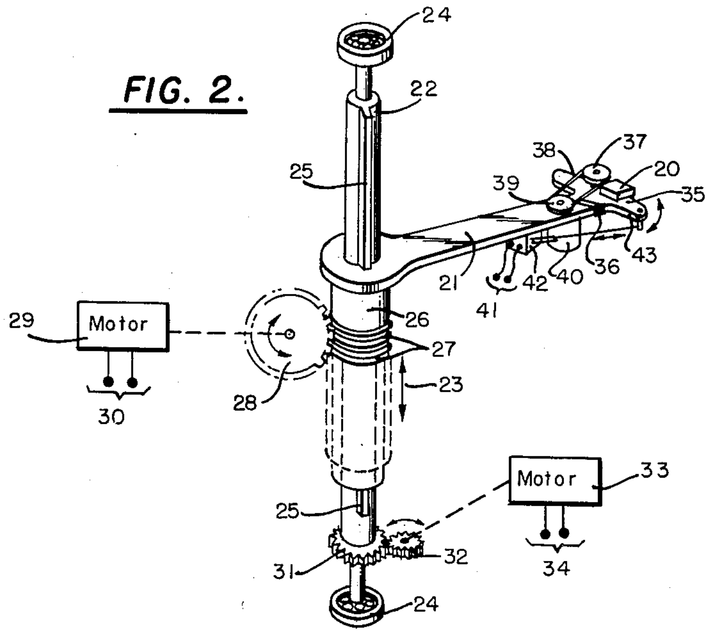
FIGURE 2 illustrates a transducer and driving structure constructed in accordance with the present invention in combination with means for causing the said transducer and driving structure to be moved selectively in various dimensions of search.

A particular preferred structure, comprising the transducer, tape drive, and search mechanism, is illustrated in FIGURE 2. This particular arrangement comprises, as has been discussed, an elongated shaft 22 supported at its opposing ends in bearings 24; and the said shaft 22 includes an elongated spline 25 thereon. Elongated arm 21 is attached to a cylindrical structure 26 surrounding splined shaft 22, and the said structure 26 is adapted to be slidably movable up or down (see 23) relative to shaft 22 and spline 25, whereby arm 21 is similarly moved up or down relative to the said elements 22 and 25. In particular, structure 26 includes a plurality of drive grooves 27 on the external periphery thereof, and these drive grooves 27 are engaged by a cogged wheel 28 which is in turn driven by a motor 29 selectively actuated at terminals 30. Application of a signal to terminals 30 thus ultimately causes cogged wheel 28 to move through a predetermined arc or through a predetermined number of revolutions whereby arm 21 is moved to an appropriate position along shaft 22, thereby to position transducer 20 at a desired tier in the cylindrical array of loop boxes shown in FIGURE 1.

Shaft 22 further includes a radial drive comprising gears 31 and 32, meshing with one another and coupled to a motor 33 actuated by a signal applied to terminals 34. Application of a signal to terminal 34 thus effects rotation of shaft 22; and due to the splined connection between shaft 22 and arm 21, the transducer 20 is caused to describe a circular motion relative to shaft 22 and relative to the inner open ends of the several loop boxes comprising the memory array. By this arrangement therefore a first dimension of search, which is substantially circular with respect to shaft 22, can be effected by application of a signal to terminals 34; and a second dimension of search, which is substantially parallel to axis 22, can be effected by application of a signal to terminals 30. It will be appreciated that the actual sequence of search is immaterial; and it will further be appreciated that signals may, if desired, be simultaneously applied to terminals 30 and 34 whereby arm 21 and transducer 20 are caused to describe a complex motion in two coordinates, thereby rapidly to position transducer 20 adjacent the open end of any preselected loop box 10. The control circuits used to control motors 29 and 33 do not form part of this invention and are not therefore disclosed herein. These circuits, however, may be conventional in nature and may, for example, be similar to selector or servo-systems as used in telephone switches, known systems used for preselecting computer memory locations or alternatively positioning systems well known in the industrial control art. An example of a simple form of one such system is described in U.S. Patent 2,751,274, issued to D. R. Andrews on June 19, 1956, wherein a plurality of retractable stop pins are arranged to stop a transducer carrier arm at selected positions depending upon the position of the pin which is not retracted. The rotational position of cogged wheel 28 and gear 31 could be controlled by such an arrangement so that the transducer 20 is positioned adjacent the opening of a preselected loop box 10.

Transducer 20 is carried by a head supporting structure 35 which is hingedly connected by hinge means 36 to arm 21; and the supporting structure 35 further includes a capstan-like drive wheel 37 thereon. Drive wheel 37 is belt-coupled at 38 to a further drive wheel 39 carried by arm 21 and operatively connected to a constantly energized drive motor 40, whereby motor 40, wheel 39 and belt 38 cause drive wheel 37 to be constantly rotating. In the normal position of supporting structure 35, drive wheel 37 is slightly spaced from the tape length 16 traversing the open end of each of (see FIGURE 3) the several loop boxes 10 whereby arm 21 can be caused to move freely in the aforementioned two dimensions of search. Once a particular box 10 has been selected for operation, a signal may be coupled to terminals 41 comprising the input to an actuator 42 (for instance a solenoid actuator), which is coupled to an arm 43 on the head supporting structure 35. This energization of terminals 41 thus causes actuator 42 to pivot structure 35 about its hinge 36 whereby drive wheel 37 moves into driving contact with a particular preselected tape.

Figure 3:
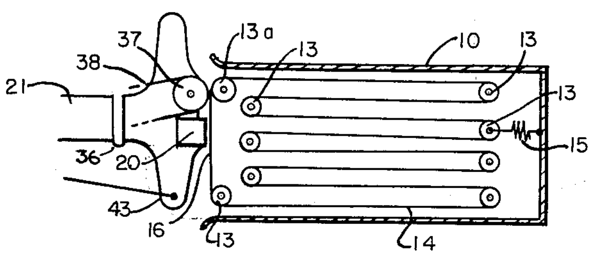
FIGURE 3 illustrates a tape loop box such as may be employed in the present invention.

Referring to FIGURE 3, it will be seen that for this drive position, the drive wheel 37 may be caused to move into engagement with a tape 16 adjacent one of the supporting rollers or pulleys 13*a*, and so long as a signal continues to be applied to terminals 41, therefore, a driving engagement between wheel 37 and tape 14 will be effected whereby the said tape will be caused to move past transducer 20.

Summarizing the foregoing structure and operation, therefore, it will be seen that in accordance with the present invention, an improved random access memory system may comprise a plurality of magnetic tapes supported for instance in loop boxes, and disposed adjacent one another along a substantially circular path whereby a transducer, which is caused to rotate along that circular path, may preselect any one of the circularly disposed tapes for operation. The several tapes and loop boxes may, in addition, be stacked on upon another thereby to effect a substantially cylindrical array; and in such a case, the aforementioned transducer may be caused to describe a second dimension of search substantially parallel to the axis of the array whereby any one of the cylindrically disposed tapes can be preselected for operation.

The arrangement further contemplates the provision of drive means carried by the same structure which supports the transducer and which is responsive to the actual position of the transducer for effecting drive to any preselected tape. The loop boxes themselves are, of course, removable from the cylindrical array or stack, and can be interchanged or stored whereby the contents of the memory may be changed by manual as well as by electrical procedures. The overall arrangement thus provides a large capacity memory having faster operation and lower cost than others suggested heretofore; provides, due to the "round" arrangement of the tape loops, for a decreased search time; and further provides for interchangeability of tape loops whereby information may be removed to dead storage or returned to active use in a most simple and efficient manner.

While I have thus described a preferred embodiment of the present invention, many variations will be suggested to those skilled in the art, and the foregoing description is therefore meant to be illustrative only and should not be considered limitative of my invention. All such variations and modifications as are in accord with the principles described are meant to fall within the scope of the appended cliams.

Having thus described my invention, I claim:

1. In a magnetic information system, a plurality of elongated magnetic tapes disposed adjacent one another along a substantially circular path, a magnetic transducer rotatably mounted adjacent said circular path, search means for moving said transducer along said circular path into a position adjacent a preselected one of said tapes, tape drive means mounted for movement with said transducer, and signal responsive means operative subsequent to operation of said search means for moving said transducer and drive means into operative juxtaposition with said preselected tape thereby to drive said preselected tape past said transducer.

2. The combination of claim 1 wherein each of said tapes comprises an endless tape loop.

3. The combination of claim 2 wherein each of said tape loops is stored in a loop box.

4. The combination of claim 1 wherein plural groups of said circularly disposed tapes are superposed upon one another thereby to effect a substantially cylindrical tape array, said search means including means for selectively moving said transducer in direction substantially parallel to the axis of said cylindrical array.

5. In an information storage system, a plurality of open-ended loop boxes disposed in a substantially hollow cylindrical array with the open ends of said boxes facing the center of said array, an endless information tape in each of said boxes, transducer means movably mounted in the hollow center of said array, search means for moving said transducer means into operative juxtaposition and for thereafter halting the movement of said transducer means adjacent a preselected one of said information tapes, and means operative subsequent to operation of said search means for driving said preselected tape past said halted transducer means.

6. The combination of claim 5 wherein said search means includes means for moving said transducer means in plural search dimensions.

7. The combination of claim 6 wherein each of said tapes comprises a magnetic tape, said transducer comprising a magnetic transducer.

8. In a magnetic information system, a plurality of magnetic tapes disposed in a hollow substantially cylindrical array, a magnetic transducer movably mounted for rotation adjacent the center of said cylindrical array, first means for rotatably moving said transducer in a first search dimension concentric with the axis of said array, second means for longitudinally moving said transducer in a second search dimension substantially parallel to the axis of said array, whereby said transducer is moved into operative juxtaposition with and thereafter halted adjacent a preselected one of said tapes, and third means operative subsequent to operation of said first and second means for driving said preselected tape past said transducer.

9. The combination of claim 8 wherein said transducer is movably supported on a shaft mounted substantially coaxial with said cylindrical array, said first means comprising means for rotating said shaft, said second means comprising means for variably positioning said transducer along said shaft.

10. In a memory system, a plurality of endless information storage tapes, means individually supporting said tapes in spaced relation to one another, a transducer movably mounted adjacent said plurality of tapes, constantly energized drive means mounted adjacent said transducer for movement with said transducer, means for moving said transducer and drive means into operative juxtaposition adjacent a preselected one of said tapes, said drive means being initially spaced from said tapes, and means responsive to the position of said transducer for moving said energized drive means into engagement with said preselected tape thereby to drive said preselected tape past said transducer.

11. The combination of claim 10 wherein said plurality of tapes comprise magnetic tapes disposed adjacent one another along a circular path.

12. The combination of claim 11 wherein plural groups of said circularly disposed tapes are stacked one upon another thereby to effect a substantially cylindrical tape array.

13. The combination of claim 12 wherein each of said tapes is disposed in loop box, said loop boxes being removably and interchangeably supported within said array.

14. In a memory system, a plurality of endless tape loops disposed adjacent one another in a plurality of superposed substantially circular arrays, a transducer rotatably mounted adjacent said arrays, search means for moving said transducer in two search dimensions into operative juxtaposition adjacent a preselected one of said tape loops in a preselected one of said circular arrays, and signal responsive means operative subsequent to completion of said two-dimensional search for driving said preselected tape loop past said transducer.

15. In a memory system, a plurality of information storage tapes disposed adjacent one another in a substantially cylindrical array, a transducer movably mounted adjacent said array, first means for moving said transducer in a circular search dimension substantially concentric with said array, and second means operative coincident with operation of said first means for moving said transducer in a linear search dimension substantially parallel to the axis of said array, whereby said transducer is rapidly moved along a path having components both parallel to and concentric with the axis of said array to a position adjacent a preselected one of said plural tapes.

16. In an information storage system, a plurality of loop boxes disposed in a substantially hollow cylindrical array, each of said boxes having an information tape therein with a portion of each said tape being exposed to the center of said array, an arm mounted in the center of said array for rotary movement past the exposed portions of said tapes, a supporting structure pivotally attached to one end of said arm adjacent said loop boxes, transducer means and drive means carried by said supporting structure, means for rotating said arm until said supporting structure is disposed adjacent a preselected one of said loop boxes, and means for thereafter pivoting said supporting structure relative to said one end of said arm thereby to move both said transducer means and drive means into operative juxtaposition adjacent the exposed portion of the tape in said preselected loop box whereby said drive means is operative to move said tape past said transducer means.

17. In an information storage system, an elongated rotatable shaft, a supporting structure slidably carried by said shaft for variable positioning along said shaft, transducer means attached to said supporting structure, first drive means coupled to said shaft for rotating said shaft, said supporting structure, and said transducer means, through an arc concentric with said shaft, second drive means coupled to said supporting structure for variably positioning said supporting structure and said transducer means along said shaft, whereby said first and second drive means cooperate to move said transducer means to variable positions both concentric with and parallel to said shaft, and a plurality of information storage elements disposed in an array having components both concentric with and parallel to said shaft whereby said tranducer means may be moved into operative juxtaposition adjacent a preselected one of said storage elements in said array under the control of said first and second drive means.

18. The combination of claim 17 wherein said first and second drive means are operative concurrently.

19. In a magnetic data storage mechanism having a transducer mounted for selective movement in two dimensions along a surface having one straight axis and defined by such transducer movement and including a plurality of straight lines; a plurality of elongated tape support members each having a tape supporting surface thereon, a portion of each tape supporting surface defining a straight line, said tape support members being arranged with said straight line portions of their tape supporting surfaces in side-by-side relation, and facing and parallel to such surface of transducer movement and spaced equally therefrom by a distance slightly greater than the thickness of a magnetic recording tape to be passed across each tape supporting surface, a flexible, magnetic, recording tape mounted for movement transversely across the straight line portion of the tape supporting surface of each tape support member, whereby movement of a transducer selectively along two dimensions of such surface of transducer movement brings such transducer into register in selected position transversely of the width of a selected one of said tapes.

20. In a magnetic data storage mechanism having a transducer mounted for selective movement in two dimensions along a surface defined by such transducer movement and by a plurality of parallel straight lines; a plurality of elongated tape support members each having a tape supporting surface thereon, a portion of each tape supporting surface defining a straight line, said tape support members being arranged with said straight line portions of their tape supporting surfaces in side-by-side relation, and facing and parallel to such surface of transducer movement and spaced equally therefrom by a distance slightly greater than the thickness of a magnetic recording tape to be passed around each tape support member, a flexible, magnetic, recording tape passed around the tape supporting surface of each tape supporting member, a portion of each tape on each side of its tape support member extending outwardly away from such surface of transducer movement, each tape being mounted for movement lengthwise thereof and transversely across the straight line portion of the tape supporting surface of its tape support member, whereby movement of a transducer selectively along two dimensions of such surface of transducer movement brings such transducer into register in selected position transversely of the width of a selected one of said tapes.

21. In a magnetic data storage mechanism having a transducer mounted for selective movement in two dimensions along a cylindrical surface defined by such transducer movement; a plurality of elongated tape support members each having a rounded, tape supporting surface thereon, a portion of each tape supporting surface defining a straight line, said tape support members being arranged with said straight line portions of their tape supporting surfaces in side-by-side relation, and facing the external side of, and parallel to, such cylindrical surface, and spaced equally therefrom by a distance slightly greater than the thickness of a magnetic recording tape to be passed around each tape support member, a flexible, magnetic recording tape passed around the tape supporting surface of each tape supporting member and extending outwardly away from such surface of transducer movement, each tape being mounted for movement lengthwise thereof and transversely across the straight line portion of the tape supporting surface of its tape support member, whereby movement of a transducer selectively along two dimensions of such cylindrical surface brings such transducer into register in selected position transversely of the width of a selected one of said tape loops.

22. In a magnetic data storage mechanism having a transducer mounted for selective movement in two dimensions along a surface defined by such transducer movement and by a plurality of parallel straight lines; a plurality of narrow tape support members each having a transversely rounded tape supporting surface thereon, a portion of each tape supporting surface defining a straight line, said tape support members being arranged in side-by-side relation and with said straight line portions of their tape supporting surfaces facing and parallel to such surface of transducer movement and spaced equally therefrom by a distance slightly greater than the thickness of a magnetic recording tape to be passed around each tape support member, a rotatable tape drive pulley mounted outwardly beyond each tape support member from such surface of transducer movement, a flexible, magnetic, recording tape in the form of a closed belt encircling the tape supporting surface of each tape supporting member and the tape drive pulley outwardly therefrom, each tape belt being sufficiently taut for driven movement lengthwise thereof and transversely across the straight line portion of the tape supporting surface of its tape support member upon rotation of its encircled drive pulley, whereby movement of a transducer selectively along two dimensions of such surface of transducer movement brings such transducer into register in selected position transversely of the width of a selected one of said tapes.

23. In a magnetic data storage mechanism having a transducer mounted for selective movement in two dimensions along a surface defined by such transducer movement and by a plurality of parallel straight lines; a plurality of elongated tape support members each having a tape supporting surface thereon, a portion of each tape supporting surface defining a straight line, said tape support members being arranged wtih said straight line portions of their tape supporting surfaces in side-by-side relation, and facing and parallel to such surface of transducer movement and spaced equally therefrom by a distance slightly greater than the thickness of a magnetic recording tape to be passed around each tape support member, a flexible, magnetic, recording tape passed around the tape supporting surface of each tape supporting member, each tape being mounted for movement lengthwise thereof and transversely across the straight line portion of the tape supporting surface of its tape support member, and means for driving each tape in said direction of movement, whereby movement of a transducer selectively along two dimensions of such surface of transducer movement brings such transducer into register in selected position transversely of the width of a selected one of said tapes.

References Cited by the Examiner

UNITED STATES PATENTS

| | | | |
|---|---|---|---|
| 1,372,975 | 3/21 | Noel | 274—10 |
| 1,697,345 | 1/29 | Chaudoir | 214—16.11 |
| 1,885,005 | 10/32 | Daily | 274—10 |
| 2,287,881 | 6/42 | Holden | 179—27.52 |
| 2,457,589 | 12/48 | Miller | 179—27.52 |
| 2,468,224 | 4/49 | Munson | 179—100.2 |
| 2,650,830 | 9/53 | Potter | 340—174 X |
| 2,690,913 | 10/54 | Rabinow | 340—174.1 X |
| 2,751,274 | 6/56 | Andrews | 346—74 |
| 2,778,880 | 1/57 | Eash | 179—100.2 |
| 2,842,754 | 7/58 | Luhn | 340—174 |
| 2,844,656 | 7/58 | Lohs | 179—27.52 |
| 2,890,288 | 6/59 | Newman | 346—74 |
| 2,914,752 | 11/59 | MacDonald | 340—174 |

FOREIGN PATENTS

| | | |
|---|---|---|
| 294,519 | 1/54 | Switzerland. |

IRVING L. SRAGOW, *Primary Examiner.*

EVERETT R. REYNOLDS, *Examiner.*